United States Patent [19]

Eriksson et al.

[11] 4,254,444
[45] Mar. 3, 1981

[54] MULTIPHASE UNDERVOLTAGE TRIPPING CIRCUITRY FOR ELECTRICAL POWER SUPPLY NETWORKS

[75] Inventors: Leif Eriksson, Sala, Sweden; Salomon Liberman, Ra'anana, Israel

[73] Assignee: ASEA Aktiebolag, Vesteras, Sweden

[21] Appl. No.: 44,563

[22] Filed: Jun. 1, 1979

Related U.S. Application Data

[63] Continuation-in-part of Ser. No. 964,199, Nov. 28, 1978, abandoned.

[30] Foreign Application Priority Data

Nov. 28, 1977 [SE] Sweden ................................ 7713409

[51] Int. Cl.³ ........................................... H02H 3/28
[52] U.S. Cl. ....................................... 361/82; 361/59; 361/65; 361/110
[58] Field of Search .................... 361/82, 83, 84, 109, 361/110, 111, 92, 59, 65; 324/51, 52

[56] References Cited

U.S. PATENT DOCUMENTS

| | | | |
|---|---|---|---|
| 3,878,460 | 4/1975 | Nimmersjo | 361/82 X |
| 3,890,544 | 6/1975 | Chamia | 361/80 |
| 3,938,007 | 2/1976 | Boniger et al. | 361/80 |
| 3,940,663 | 2/1976 | Meier et al. | 361/59 X |
| 3,956,671 | 5/1976 | Nimmersjo | 361/65 X |
| 4,053,816 | 10/1977 | Nimmersjo | 361/110 X |
| 4,092,691 | 5/1978 | Williams | 361/110 X |

*Primary Examiner*—Patrick P. Salce
*Attorney, Agent, or Firm*—Watson, Cole, Grindle & Watson

[57] ABSTRACT

Circuitry for generating tripping and blocking signals for the protection of electrical components included in electrical power supply networks as a result of the occurrence of faults therein provides multiphase pole tripping in the event that, after a single pole tripping has been executed, a new single phase fault occurs in any of the remaining phases of the electrical power supply network. Respective tripping and blocking signals are generated for each phase of the electrical power supply network in dependence on whether the fault lies ahead or behind the electrical component to be protected, respectively, in response to measurement of the voltae and current associated with transient waves generated by faults associated with each electrical power supply network phase. Multiphase pole tripping signals are generated by undervoltage detector logic circuitry responsive to the generation of the tripping signals upon the occurrence of a single phase fault, and the sensing of an undervoltage in another phase of the electrical power supply network before reclosing of the faulty phase.

4 Claims, 6 Drawing Figures

MULTIPHASE UNDERVOLTAGE TRIPPING CIRCUITRY FOR ELECTRICAL POWER SUPPLY NETWORKS

This is a continuation-in-part application of application Ser. No. 964,199, filed Nov. 28, 1978, and now abandoned.

BACKGROUND

1. Field of the Invention

The present invention relates to three-phase relay protection devices for electrical power supply networks, and more particularly a protection device by means of which a triple-pole tripping is achieved in the event that, after a single pole tripping has been executed, a new single phase fault occurs in any of the two remaining phases.

2. Prior Art

When a fault occurs in an electrical power supply network, an electrical transient wave propagates therein and, because of repeated reflections in various discontinuities in the network, such as transformers, stations and the sources of the fault, the currents and voltages contain transients which are disadvantageous for the measuring relays in the relay protection devices. The dominant frequencies in such transients depend on the distance to the fault and the network configuration. Investigations have shown that, even with the introduction of transient suppression filters, it is difficult to use, for example, conventional impedance relays for relay protection devices, the operating time of which is to be less than the time of a cycle. In case of higher system voltages, greater demands are placed on the rapidity of the relay protection devices, while at the same time the damping of the transient waves decreases. It is therefore more difficult to apply traditional measuring principles to the relay protection devices.

From, for example U.S. Pat. No. 3,956,671, it is known to utilize the direction of movement of the transient waves at a measuring point for determining the direction to the source of disturbance. By comparing the polarities of the current and voltage waves, for example, it is possible to determine whether the fault lies ahead or behind the measuring point.

In the case of single-phase faults in networks with high system voltages, particularly in radial or thinly meshed networks, it is sometimes desirable for the relay protection devices to release only the faulty phase (so-called single-pole tripping). Since the other two phases are intact, it is easier to maintain stability in the network, at least for some time until high speed reclosing of the originally faulty phase.

When single pole tripping has been carried out, a new single-phase fault may occur in one of the intact phases before the line is rapidly reclosed, which usually takes place within 0.5 to 1.5 seconds after the disconnection. In that case it is desirable to avoid a further single-phase tripping, since only one intact phase would then remain and could not on its own maintain stability in the network. Instead, it is desirable in such cases that both of the two remaining phases are released. In conventional distance protection devices this is achieved by some type of undervoltage criterion from the released phase and impedance measuring in the intact phases. The disadvantage with this method is that it will be difficult to achieve operating times below 0.5 to 1 cycle of the fundamental frequency.

SUMMARY OF THE INVENTION

In accordance with the invention a multiphase directional wave detector includes identical single phase partial detectors for generating respective tripping signals and blocking signals for each phase of the electrical power supply network to be protected, and in dependence on whether the fault lies ahead or behind the electrical component to be protected, respectively, in response to measurement of the voltage and current associated with transient waves in each phase of the electrical power supply network generated by faults associated therewith. Undervoltage detector means are responsive to the generation of the tripping signals upon the occurrence of a single phase fault and for sensing an undervoltage in another phase of the electrical power supply network to generate multiphase pole tripping signals before reclosing of the faulty phase. The undervoltage detector means includes a first logic circuit responsive to the tripping signals for generating a pole tripping output for each phase of the electrical power supply network. A second logic circuit, for each phase of the electrical power supply network, is responsive to measured voltage signals representative of the respective voltages of the transient waves in each of the electrical power supply network phases and to the tripping signals, for generating a logic output signal when the voltage signal of an unfaulted phase is less than a threshold value. The first logic means is responsive to the logic output signal for generating the multiphase pole tripping signals. The second logic circuit includes undervoltage sensing means for generating an output when a respective one of the measuring phase voltages is less than a threshold level. Pulse shaping means are responsive to the undervoltage sensing means for generating an extended pulse with the measured undervoltage exceeding a first predetermined time, and a number of AND gates respectively responsive to the phase tripping signals and to the respective outputs of the pulse shaping means for generating signals indicative of the occurrence of a single phase fault on another of the electrical power supply network phases. A relay is responsive to the multiphase pole tripping signals and includes a second pulse shaping circuit for generating an extended multiphase pole tripping signal providing the multiphase pole tripping signal from the undervoltage detector means is present for a given period of time.

BRIEF DESCRIPTION OF THE FIGURES

The protection device and its mode of operation according to the invention are described with reference to the accompanying drawing Figures wherein.

DETAILED DESCRIPTION

Figure 1:
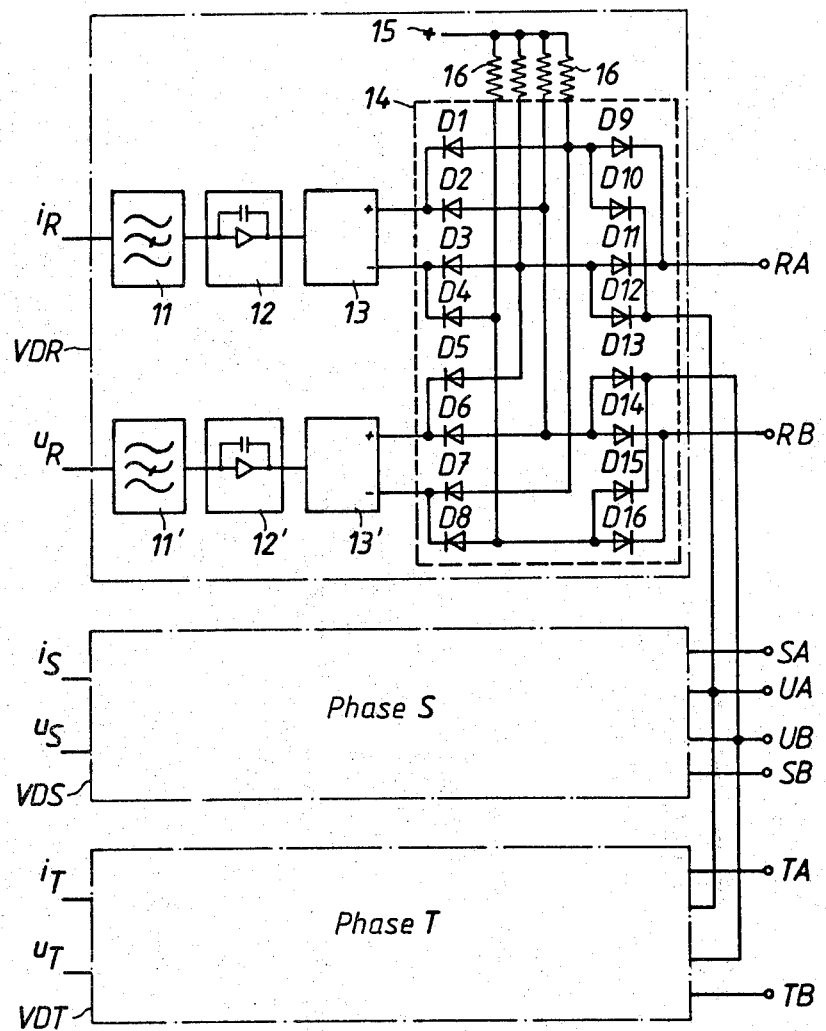
FIG. 1 shows a wave detector included in the protection device.

FIG. 1 shows a three-phase, directional wave detector assembled from three identical single-phase partial detectors VDR, VDS and VDT, one for each phase, and which constitutes a basic component of the protection device. Only partial detector VDR is shown in its entirety in FIG. 1. Each partial detector has an input $i_R$, $i_S$, or $i_T$, respectively representing current measurement signals in the three phases and an input $u_R$, $u_S$, or $u_T$, respectively representing voltage measurement signals. The signals correspond to the three phase currents through the measuring point and three suitably chosen phase voltages, and are normally derived by means of instrument transformers as is known in the art. For each of the current and voltage measurement input signals, each partial detector has band exclusion filters 11, 11' which trap components of the input signal having the same frequency as the power supply network, and the output of which is connected to integrating circuit 12 or 12'. Polarity indicators 13, 13' connected to the output of the respective integrating circuit, each have a + output and a − output and conduct the signal received from the integrator to the + output if it is positive, and to the − output as a positive signal if the received signal is negative.

Each partial detector contains a directional detector 14, which in partial detector VDR is marked by dashed lines. Directional detector 14 is constructed from a number of diodes D1–D16 connected to the + pole of voltage source 15 through resistors 16. Directional detector 14 delivers an output signal on output RA and the output UA, which is common to the whole wave detector, if the signals to the two polarity indicators 13, 13' have different polarities, whereas an output signal occurs on outputs RB and UB, respectively, if the signals have the same polarity.

The output signal is positive in the embodiment shown in FIG. 1 and its amplitude corresponds to the amplitude of the smallest of the input signals to polarity indicators 13, 13'. The largest of the signals occurring at RA, SA, TA and RB, SB, TB, respectively, is emitted to the outputs UA and UB, which are common to all three partial detectors, because of the operation of diodes D9–D16 at the output side of directional detectors 14.

In each connection to an electrical component, the positive current direction is defined as the direction towards the component in question. If a transient wave moves in the negative direction, the wave detector emits tripping signals on tripping outputs RA, SA, TA and on UA; and if the transient wave moves in the positive direction, blocking signals are obtained on blocking outputs RB, SB, TB and on UB. If a certain wave detector is used for protection of a second adjacent component, the blocking signal has a tripping effect, and the tripping signal a blocking effect for the second component.

Figure 2:
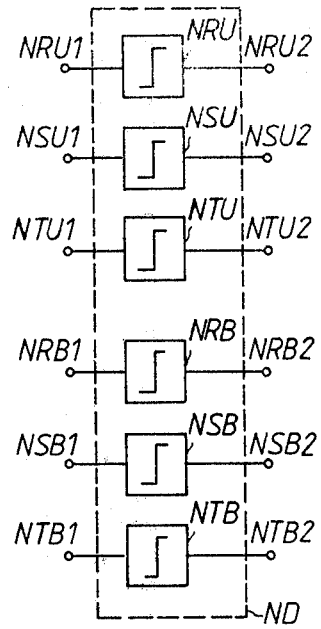
FIG. 2 shows a level detector having inputs for connection to the outputs of the wave detector of FIG. 1.

The output signals from the wave detector are supplied to level detector ND shown in FIG. 2. Level detector ND has three level-sensing partial detectors NRU, NSU, NTU for providing respective tripping signals for each phase. The inputs NRU1, NSU1, NTU1 are each respectively connected to a corresponding tripping output RA, SA, TA of the wave detector in FIG. 1. Each of level-sensing partial detectors NRU, NSU, NTU has one output NRU2, NSU2, NTU2, respectively. The level detector also includes three level-sensing partial detectors NRB, NSB, NTB for respectively generating blocking signals from respective inputs NRB1, NSB1, NTB1, each of which is connected to a corresponding blocking output RB, SB, TB of the wave detector of FIG. 1. Level-sensing partial detectors NRB, NSB, NTB each provide a respective output NRB2, NSB2, NTB2 as shown in FIG. 2.

Figure 3:
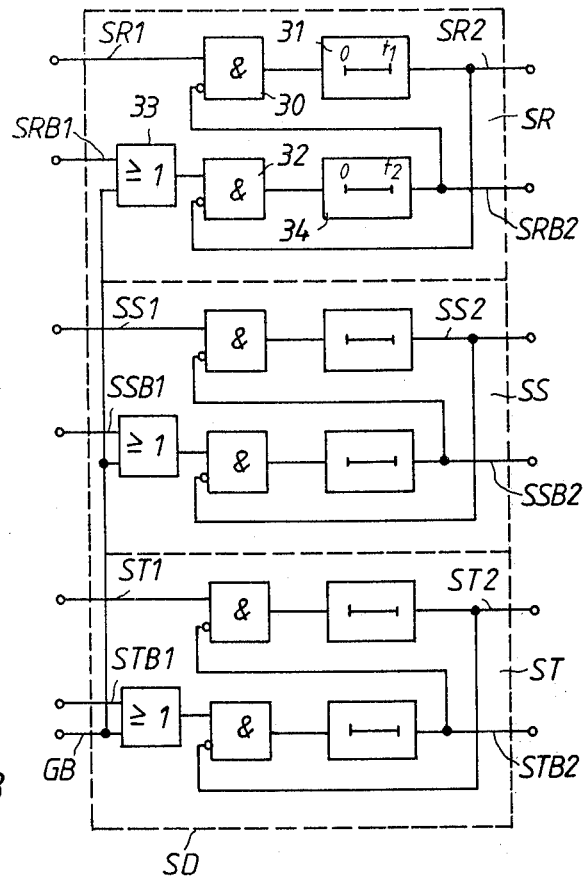
FIG. 3 shows a sequence detector having inputs for connection to the outputs of the level detector of FIG. 2.

FIG. 3 shows a schematic of sequence detector SD included in the logic system. It comprises three identical partial detectors SR, SS, ST, one for each phase. Since the three partial detectors are identical, only partial detector SR of the R-phase is described in detail. Partial detector SR includes first AND gate 30, one input of which is connected to input SR1, which in the logic system is connected to the output NRU2 of the level-sensing partial detector NRU. The output of AND gate 30 is connected through delay circuit 31 to output SR2 of partial detector SR. An input of second AND gate 32 is connected to the output of OR gate 33, one input of which is connected to input SRB1 of partial detector SR. Input SRB1 is a blocking input and connected in the logic system to blocking output NRB2 of the level-sensing partial detector NRB. The second input of OR gate 32 is connected to blocking input GB common to the entire sequence detector SD. Blocking input GB is a blocking signal, for example from a protection device in an adjacent component when the last-mentioned protection device has tripped. The second input of AND gate 32, which is inverted, is connected to output SR2 and its output is connected, via second time delay circuit 34, to the blocking output SRB2 as well as to the second inverted input of first AND gate 30.

When no signal is present, a "one" is applied on the lower, inverted input of each of gates 30 and 32. If a tripping signal arrives at the upper input of gate 30, a "one" appears on its output and a tripping signal appears on output SR2 for at least the time interval $t_1$. The lower input of AND gate 32 is "zero", whereby a possible blocking signal on input SRB1 cannot pass AND gate 32 and occur as a blocking signal on output SRB2.

Figure 4:
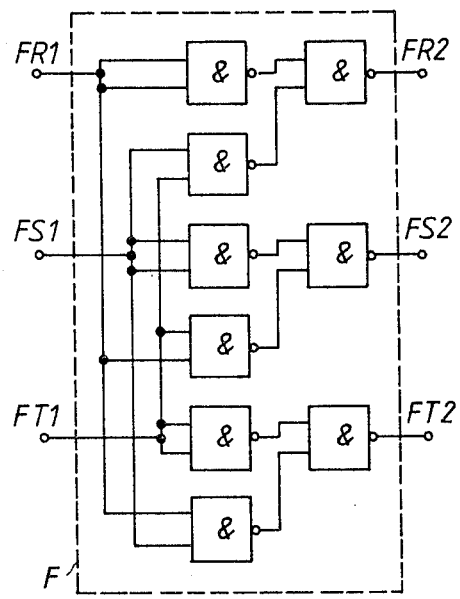
FIG. 4 shows a phase selector adapted to be connected to the sequence detector of FIG. 3.

For single pole tripping of circuit-breakers in the case of a single-phase ground fault, the protection logic system includes phase selector F (an exemplary embodiment thereof is shown in FIG. 4) constructed of logic elements.

Phase selector F generates a "one" on all outputs FR2, FS2 and FT2 if at least two of inputs FR1, FS1 and FT1 are a "one". If, however, as is the case with a single phase fault, only one of the inputs is a "one", only the corresponding output will provide a "one". Inputs FR1, FS1, FT1 are respectively connected to partial detector outputs SR2, SS2, ST2. The operation of phase selector F is apparent from its logic structure and therefore a detailed explanation is not necessary for the purposes of using the invention.

Figure 5:
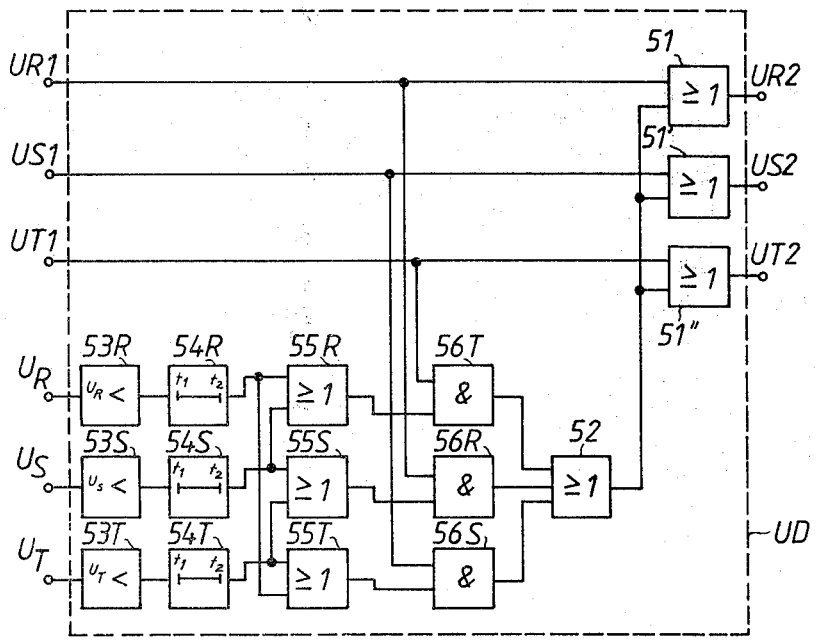
FIG. 5 shows an undervoltage detector having inputs adapted to be connected to the outputs of the phase selector of FIG. 4 as well as to the voltage inputs of the wave detector of FIG. 1.

FIG. 5 shows a schematic of undervoltage detector UD which is connected to the outputs FR2, FS2 and FT2 of the phase selector by inputs UR1, US1 and UT1. The function of this detector, in the event that a single pole tripping has been made and a new single phase fault occurs in any of the two intact phases before the faulty line has been rapidly reclosed, is to prevent an additional single pole tripping of any of the two intact phases. Such further single pole tripping would mean that only one intact phase would remain, and this single phase cannot maintain stability. In such cases, undervoltage detector UD effects a triple pole tripping.

Undervoltage detector UD has inputs UR1, US1, UT1 connected to a respective input of OR gates 51, 51', 51", the outputs of which are respectively outputs UR2, US2, UT2 of the undervoltage detector. The other inputs of OR gates 51, 51', 51" are connected to the output of OR gate 52. The undervoltage detector UD has three additional inputs $U_R$, $U_S$, $U_T$, which are connected to the corresponding inputs of wave detector VD in FIG. 1. Each such input is connected to a respective voltage detector 53R, 53S, 53T which, upon a reduction of the voltage below a certain set level of each respective phase, delivers a signal to a respective timing circuit 54R, 54S, 54T, which emits a signal for at least a time duration $t_2$ if the voltage reduction has lasted for at least time $t_1$. The respective signal outputs from timing circuits 54R, 54S, 54T are input to OR gates 55R, 55S, 55T as shown in FIG. 5. The second input of each gate is connected to the first input of another of the OR gates 55R, 55S, 55T, thus achieving some form of delta connection. The respective outputs of OR gates 55R, 55S, 55T are connected to a respective input of AND gates 56R, 56S, 56T. The second inputs of AND gates 56R, 56S, 56T are respectively connected to inputs UR1, US1 and UT1. Each AND gate 56R, 56S, 56T is thus connected by its inputs to all three phases, either directly or through OR gates 55R, 55S, 55T. The outputs of AND gates 56R, 56S, 56T are connected to the inputs of OR gate 52.

If a single-phase fault occurs, for example in the R-phase, the tripping signal passes directly through undervoltage detector UD from input UR1 through OR gate 51 to output UR2. At the same time, AND gate 56R receives a "one" on its upper input, but no triple pole tripping can take place since gate 52 has "zero" on all inputs. If the voltage $U_R$ has been lower than the set value of voltage detector 53R for at least time $t_1$, timing circuit 54R would generate a "one" on its output and thus also on the lower inputs of OR gates 56T and 56S via AND gates 55R and 55T. Even if voltage $U_R$ would then increase to a level exceeding the set threshold value on voltage detector 53R, that signal "one" will remain for at least time interval $t_2$. Now, if an additional single-phase fault occurs on either of phases S or T, for example phase T, a "one" occurs on input UT1 and thus also on the upper input of AND gate 56T. Since the lower input of AND gate 56T already has a "one" because of the undervoltage in the R-phase as mentioned above, AND gate 56T generates an output "one" and OR gate 52 supplies "ones" on the lower input of all three gates 51, 51', 51", and thus a tripping signal is generated on outputs UR2, US2, UT2.

Figure 6:
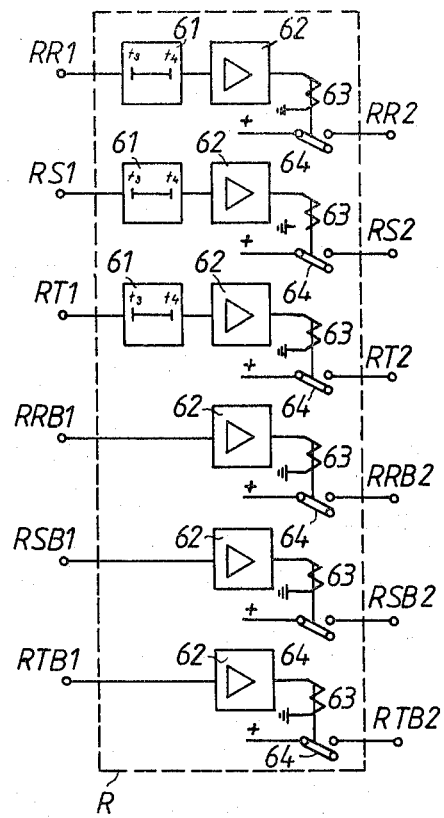
FIG. 6 shows a relay unit.

Outputs UR2, US2, UT2 of undervoltage detector UD are each connected to an input RR1, RS1, RT1 of a relay unit R, as shown in FIG. 6, which contains time delay circuit 61 and an amplifier 62 for each phase. The timing circuit extends an incoming tripping pulse so that it lasts for the time interval $t_2$, provided that the tripping pulse has lasted for at least time $t_1$. Amplifier 62 feeds current to winding 63 in a relay with a make contact 64. On the operation of the relay, a tripping current is fed into outputs RR2, RS2, RT2. The relay unit also has three blocking signal inputs RRB1, RSB1, RTB1 connected to corresponding blocking outputs SRB2, SSB2, STB2 of sequence detector SD in FIG. 3. Also in this case an amplifier 62 is arranged in each phase. The blocking signals occur on outputs RRB2, RSB2, RTB2, and as there are no time delay circuits in the blocking circuits of the relay R, a blocking signal always precedes a tripping signal.

Time delay circuit 61 is necessary at least in those cases where the protected component is a section of the line, because then it is necessary to wait for a possible blocking signal from the other end of the line. The delay $t_3$ must be sufficiently long such that a blocking signal from the other end of the line can arrive before a tripping signal is emitted. The delay should be capable of being varied for adjustment to the delay of the communication channel that transmits the signals between the two ends of the line section. Time interval $t_4$, which extends the tripping pulse, is necessary only in those cases where the duration of the tripping pulse is shorter than the time of operation of the tripping relay 63.

What is claimed is:

1. Circuitry for generating tripping and blocking signals for the protection of electrical components included in electrical power supply networks as a result of the occurrence of faults therein, comprising:
    means for generation of respective tripping signals and blocking signals for each phase of the electrical power supply network, in dependence on whether the fault lies ahead or behind the electrical component to be protected, respectively, in response to measurement of the voltage and current associated with transient waves generated by faults associated with each phase of the electrical power supply network; and
    undervoltage detector means responsive to the generation of a tripping signal upon the occurrence of a single phase fault and for sensing an undervoltage in another phase of the electrical power supply network to generate multiphase pole tripping signals before reclosing of the faulty phase.

2. Circuitry as in claim 1 wherein said undervoltage detector means includes first logic circuit means responsive to said tripping signals for generating a pole tripping output for each phase of said electrical power supply network;
    second logic circuit means for each phase of said electrical power supply network and responsive to measured voltage signals representative of the respective voltage in each phase of said electrical power supply network phases, and to said tripping signals for generating a logic output signal when the voltage signal of an unfaulted phase is less than a threshold value; and
    said first logic circuit means being responsive to said logic output signal for generating said multiphase pole tripping signals.

3. Circuitry as in claim 2 wherein said second logic circuit means includes undervoltage sensing means for generating an output when a respective one of said measured phase voltages is less than a threshold level, pulse shaping means responsive to said undervoltage sensing means for generating an extended pulse with the measured undervoltage exceeding a first predetermined time, and a number of AND gates respectively responsive to the phase tripping signals of said means for generation of tripping signals and to the respective outputs of said pulse shaping means for generating signals indicative of the occurrence of a single phase fault on another of said electrical power supply network phases.

4. Circuitry as in claim 3 further comprising a relay responsive to said multiphase pole tripping signals and including second pulse shaping circuitry for extending said multiphase pole tripping signals with said multiphase pole tripping signals exceeding a second predetermined time.

* * * * *